United States Patent
Baird et al.

(10) Patent No.: US 7,293,145 B1
(45) Date of Patent: Nov. 6, 2007

(54) SYSTEM AND METHOD FOR DATA TRANSFER USING A RECOVERABLE DATA PIPE

(75) Inventors: Robert Baird, San Jose, CA (US); Anand A. Kekre, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 438 days.

(21) Appl. No.: 11/059,091

(22) Filed: Feb. 16, 2005

Related U.S. Application Data

(63) Continuation-in-part of application No. 10/966,791, filed on Oct. 15, 2004.

(51) Int. Cl.
*G06F 12/00* (2006.01)
*G06F 13/00* (2006.01)

(52) U.S. Cl. ............................. 711/162; 709/7; 709/20; 709/21; 709/29; 709/33

(58) Field of Classification Search ................ 711/147, 711/150, 154, 162, 169; 709/6, 7, 11, 20, 709/21, 29, 33, 35, 36
See application file for complete search history.

(56) References Cited

U.S. PATENT DOCUMENTS

| | | | |
|---|---|---|---|
| 6,128,630 A | 10/2000 | Shackelford | |
| 6,651,075 B1 | 11/2003 | Kusters et al. | |
| 6,694,323 B2 | 2/2004 | Bumbulis | |
| 6,732,125 B1 | 5/2004 | Autrey et al. | |
| 6,792,432 B1 | 9/2004 | Kodavalla | |
| 7,051,123 B1 * | 5/2006 | Baker et al. | .................. 710/22 |
| 2005/0071379 A1 | 3/2005 | Kekre | |

OTHER PUBLICATIONS

Rosenblum, et al, "The Design and Implementation of a Log-Structured File System", *Proceedings of the Thirteenth ACM Symposium on Operating System Principles*, Pacific Grove, CA, Oct. 13-16, 1991.
Sullivan, et al, "An Index Implementation Supporting Fast Recovery for the POSTGRES Storage System", *Proceedings of the Eighth International Conference on Data Engineering*, Tempe, AZ, Feb. 3-7, 1992.
"A Guide To Understanding VERITAS Volume Replicator™," White Paper, VERITAS, p. 1-15, 2002.

(Continued)

*Primary Examiner*—Jack Lane
(74) *Attorney, Agent, or Firm*—Meyertons Hood Kivlin Kowert & Goetzel, P.C.; B. Noël Kivlin

(57) ABSTRACT

A system for data transfer using a recoverable data pipe includes a data producer, one or more data consumers, a storage device and a data pipe manager. The data producer may be configured to append updated data blocks to the storage device via a producer storage input/output (I/O) channel. The data consumers may be configured to read data blocks from the storage device via consumer storage I/O channels. The data pipe manager may be configured to maintain metadata identifying data blocks of the storage device that have been read by each data consumer, and to release backing storage corresponding to the data blocks that have been read by all data consumers.

24 Claims, 10 Drawing Sheets

OTHER PUBLICATIONS

Senicka, J., "A Guide To Implementing Cost Effective High Availability Techniques Using VERITAS Cluster Server," White Paper, VERITAS, p. 1-8, Aug. 2004.

Chamberlin, et al., "A History and Evaluation of System R," Communications of the ACM, vol. 24, No. 10, p. 632-646, Oct. 1981.

"VERITAS Storage Foundation™, Technical Overview," VERITAS, pp. i-32, Apr. 2002.

Goodheart, Berny, et al, "The Magic Garden Explained," Prentice Hall, 1994, p. 51-63.

"IBM WebSphere MQ Everyplace," IBM Corporation, WebSphere Software, 2002, p. 1-5.

"SharePlex® for Oracle, The Complete Replication Solution," Quest Software, 2005, pp. 2

\* cited by examiner

SYSTEM AND METHOD FOR DATA TRANSFER USING A RECOVERABLE DATA PIPE

This application is a continuation-in-part of prior application Ser. No. 10/966,791, entitled "System and Method For Loosely Coupled Temporal Storage Management", filed Oct. 15, 2004.

BACKGROUND OF THE INVENTION

1. Field of the Invention

This invention relates to computer systems and, more particularly, to data transfer in computer systems.

2. Description of the Related Art

Many business organizations and governmental entities rely upon applications that access large amounts of data, often exceeding many terabytes of data, for mission-critical applications. A variety of different storage devices, potentially from multiple storage vendors, with varying functionality, performance and availability characteristics, may be employed in such environments. Numerous data producers (i.e., sources of new data and updates to existing data) may need to transfer large amounts of data to consumers with different sets of storage access requirements. In some enterprise environments, hundreds or thousands of data producers and data consumers may be operating at any given time. Sustained update rates on the order of tens to hundreds of gigabytes per hour may need to be supported in large enterprise data centers, with spikes of even higher levels of I/O activity. In some environments, furthermore, access patterns may be skewed towards the most recently updated data: that is, instead of being uniformly spread over an entire data set, a relatively large proportion of write and read requests may be directed at a "working set" of recently modified data.

As the heterogeneity and complexity of storage environments increases, and as the size of the data being managed within such environments increases, providing a consistent quality of service for data transfer operations may become a challenge. Quality of service requirements may include the ability to predictably sustain data transfers at desired rates between data producers and data consumers, data integrity requirements, and the ability to recover rapidly from application, host and/or device failures. At the same time, advanced storage features, such as replication and archival capabilities, may also be a requirement for enterprise-level storage environments.

Some traditional data sharing mechanisms, such as applications that may utilize NFS (Network File Systems) or FTP (File Transfer Protocol), may rely on data transmission over networking protocols such as one or more underlying protocols of the Transmission Control Protocol/Internet Protocol (TCP/IP) family. Such traditional mechanisms may sometimes provide unpredictable levels of performance, especially in response to error conditions and/or network congestion. In addition, many traditional networking protocols may have been originally designed for short messages, and may not scale well for large data transfers. Networking software stacks within operating systems and/or service-specific daemons or service processes may add to dispatch latency and processing load at data producers and data consumers. Simultaneous transfer of data between a single data producer and multiple data consumers may require the use of relatively inefficient broadcast or multicast protocols. Some data sharing mechanisms that rely on file systems may also result in additional overhead for file management.

Other traditional data sharing mechanisms, such as various types of clustered systems, may require data producers and data consumers to be tightly coupled (e.g., configured within a single cluster), even if application requirements may demand other configurations of producers and consumers, such as producers and consumers in different clusters or within un-clustered servers. Some clustering solutions may also require extensive and cumbersome configuration management. In addition, traditional data transfer mechanisms may provide inadequate support for efficiently re-using resources (such as disk space or memory) dedicated to data transfer, for example, insufficient support may be provided to re-use storage for the data that has already been consumed while a long data transfer continues. The requirements for sustained high performance, predictability, and improved data integrity during data transfers may place a high burden on system managers.

SUMMARY

Various embodiments of a system and method for data transfer using a recoverable data pipe are disclosed. According to a first embodiment, the system includes a data producer, one or more data consumers, a storage device and a data pipe manager. The data producer may be configured to append updated data blocks to the storage device via a producer storage input/output (I/O) channel. That is, in an embodiment where the storage device presents a linear address space, the data producer may be configured to add blocks containing updated data at a higher address within the linear address space than was used for previous updates. The one or more data consumers may be configured to read data blocks from the storage device via consumer storage I/O channels. Portions of the storage device that are currently in use, e.g., portions that have been written by the data producer but have not yet been read or discarded by at least one data consumer, may be backed at persistent storage, thus allowing the in-use portions of the storage device to be recovered in the event of a failure.

In some embodiments, data consumers may read data blocks sequentially, i.e., generally in the same order as the order in which the data blocks were written. Each data consumer may read data independently of other data consumers and of the data producer; e.g., with minimal direct interactions between different data consumers and the data producer. The data pipe manager may be configured to maintain metadata identifying data blocks of the storage device that have been read by each data consumer, and to release backing storage corresponding to the data blocks that have been read by all data consumers. For example, in one implementation the metadata may include a data low watermark pointing to an address representing the latest data block that has been read by all data consumers. The metadata may also comprise additional information in some embodiments, such as a storage low watermark and a storage high watermark identifying an address range within the storage device that is currently backed at persistent storage, and/or a data high watermark identifying the latest data block written by the data producer.

Data producers may write data independently of the rate at which data consumers read data in some embodiments. For example, a data consumer may be reading a first data block of the storage device (e.g., a block at an address X), while a data producer may concurrently be appending or writing a second data block (e.g., a block at address X+Y). In other embodiments, the data pipe manager may release a given data block concurrently with reads to other data blocks from one or more data consumers and/or concurrently with data block append operations from the data producer. Thus, the operations of data producers, data consumers and the data pipe manager may be autonomous, independent and asynchronous with respect to each other. The data pipe manager may be configured to allocate released backing storage to store additional data blocks appended by the data producer in some embodiments. For example, after a range of data blocks have been read and processed by all data consumers, the data pipe manager may be configured to release the backing storage corresponding to the range of data blocks (e.g., into a pool of free storage), and to re-use the released backing storage for new updates from the data producer.

In one embodiment, the storage device may comprise a logical volume. The logical volume may be striped and/or mirrored across multiple physical storage devices in some embodiments. The portion of the storage device that is currently backed by persistent storage may be recoverable in the event of a failure such as a system crash. In some embodiments, updates to the storage device may be applied in batches; e.g., more than one data block may be appended to the storage device in a single transaction. The metadata for the storage device may include one or more commit records in some embodiments, where each commit record corresponds to a batch of updates, and where each commit record includes storage and data watermarks. The metadata may be stored within the storage device in one embodiment. Components of the data pipe manager may be incorporated with one or more support servers, and/or within a data producer or one or more data consumers in some embodiments. In some embodiments, the data pipe manager may support one or more interfaces, such as an application programming interface (API) supporting functions such as open( ), close( ), read( ) and write( ), which may be similar to functions typically supported by file systems. Such APIs may allow end-user applications and/or storage management software such as volume managers to access the storage device.

Figure 1:
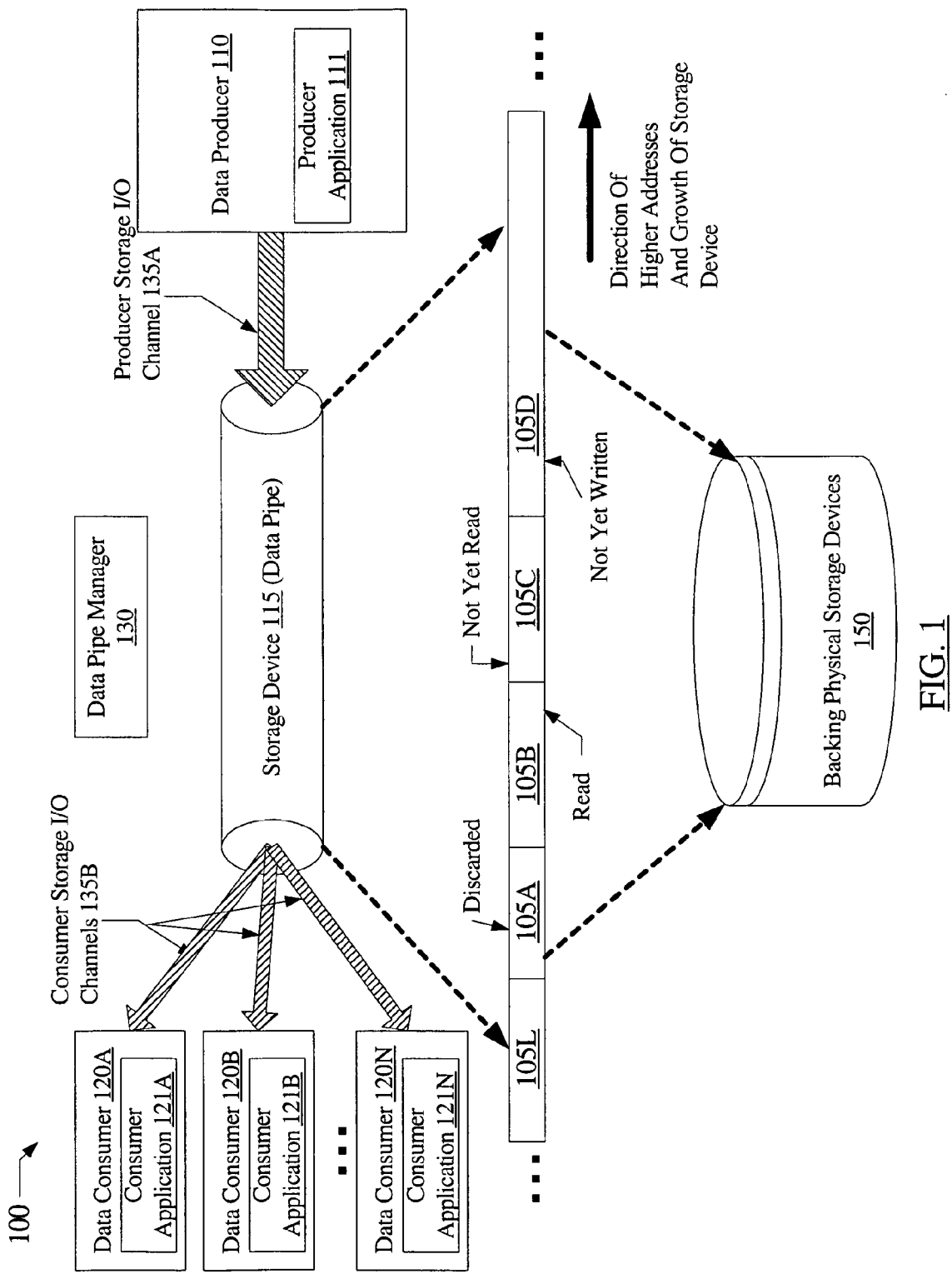
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a data producer 110, one or more data consumers 120A, 120B, . . . 120N (which may be collectively referred to herein as data consumers 120), a storage device 115, and a data pipe manager 130. The data producer 110 may be configured to append updated data blocks to the storage device 115, for example as data blocks are modified or written by one or more producer applications 111, via a producer storage input/output (I/O) channel 135A. Each of the data consumers 120 may be configured to read data blocks of storage device 115 via consumer storage I/O channels 135B, for example in response to read requests generated by consumer applications 121A, 121B, . . . 121N (collectively, applications 121). Storage device 115 may be configured to present a linear address space to data producer 110 and data consumers 110, such that data producer 110 always appends a data block at a higher logical address of the storage device 115 than previously appended data blocks. In some embodiments, for example, storage device 115 may comprise one or more logical volumes.

As shown in FIG. 1, data producer 110 may be pictured as adding data at one end of storage device 115 (i.e., the end with the blocks with the highest currently allocated addresses within the linear address space), while data consumers 120 may be pictured as reading data from the other end of storage device 115 (i.e., from lower addresses of the linear address space). Storage device 115 may also be referred to herein as a data pipe. Only one data producer 110 may be granted write access to storage device 115 in some embodiments. Data pipe manager 130 may be configured to maintain metadata identifying data blocks of storage device 115 that have been read by each data consumer 120. At any point in time, at least a portion of storage device 115 may be backed or stored within one or more backing physical storage devices 150. For example, in some embodiments, backing physical storage devices 150 may implement one or more mirrored and/or striped logical volumes, thus allowing the backed portion of storage device 115 to be recovered in the event of a failure. Data pipe manager 130 may also be configured to release and re-use backing storage corresponding to data blocks of storage device 115 that have already been read by each data consumer 120.

The metadata maintained by data pipe manager 130 may include a number of pointers to specific regions or addresses of storage device 115 in different embodiments. For example, in one embodiment, one pointer may identify an un-backed region 105L, consisting of data blocks of storage device 115 that are no longer backed at physical storage devices 150. Another pointer may identify a discarded region 105A containing data blocks whose backing storage may be released by data pipe manager 130. In one embodiment, each data consumer 120 may be configured to designate data blocks of storage device 115 for which reading and/or processing has been completed as being appropriate for discarding. In such an embodiment, data blocks that have been designated by every data consumer as being appropriate for discarding may form region 105A, and data pipe manager 130 may be configured to release backing storage corresponding to region 105A as needed. Another pointer within the metadata may identify a region 105B containing data blocks that have been read by at least one data consumer 120, but not read by all data consumers in some embodiments. Region 105C, consisting of data blocks that may have been written by data producer 110, but may not yet have been read by any data consumer 120, may be identified by another pointer in one embodiment. Region 105D may consist of blocks that have not yet been written by data producer 110. In some embodiments, portions of regions 105A and 105D, and all of regions 105B and 105C, may be backed at physical storage devices 150 at any given time.

Producer application 111 may be any application that generates data that may be consumed or processed by a data consumer application 121. For example, in one embodiment a producer application 111 may be configured to extract data from a database repository (e.g., based on a specific criterion such as a data insertion date range, or based on the parameters of a query), and transfer the extracted data through storage device 115 for analysis by a data mining consumer application 121. Data producer 110 and data consumers 120 may each comprise any device or system capable of supporting applications such as producer application 111 and consumer applications 121, such as a computer server including one or more processors, one or more memories and various peripheral devices.

Producer storage I/O channel 135A and consumer storage I/O channels 135B may each include a storage interconnect that allows shared access to backing physical storage devices 150 from data producer 110 and data consumers 120. In some embodiments, for example, a producer or consumer storage I/O channel may include one or more fibre-channel links, over which data may be transferred using a storage protocol such as Fibre-Channel Arbitrated Loop Protocol (FCAL) (e.g., without relying on TCP/IP). In other embodiments, a version of a Small Computer System Interface (SCSI) protocol allowing shared access may be employed for data transfer over the producer and consumer storage I/O channels. In some embodiments, a combination of protocols may be used (e.g., encapsulated SCSI commands over fibre channel). In one embodiment, the type of interconnect hardware implementation and protocol used by data producer 110 may differ from the interconnect hardware implementation and protocol used by one or more data consumers 120. It is noted that multiple data consumers 120 may share at least part of a consumer storage I/O channel 135B in one embodiment. Backing physical storage devices 150 may include any of a variety of physical storage devices in different embodiments, such as individual disks, disk arrays, various levels of RAID (Redundant Arrays of Inexpensive Disks) devices, non-volatile random access memory (NVRAM), etc. In some embodiments, a backing physical storage device 150 may include one or more levels of storage cache (for example, a disk array may include a front-end NVRAM cache).

As described below in further detail, the update operations of the data producer 110 and the read operations of data consumers 120 may be performed independently of each other in some embodiments. For example, at a given point of time, data producer may be appending a data block at address X of storage device 115, data consumer 120A may be reading a data block at address (X−A), data consumer 120B may be reading a data block at address (X−B), and so on. The use of independent storage I/O channels by data producer 110 and data consumers 120 may support such independent and autonomous reading and writing operations with minimal interference between data producer 110 and data consumers 120. To consumer applications 121 and producer applications 111, storage device 115 may appear to consist of locally connected storage, for which no locking or intermediary servers are required. In addition, the operations of data pipe manager 130, such as identifying data blocks of storage device 115 whose backing storage may be released and/or re-used, and releasing or re-using such data blocks, may also be performed independently and autonomously with respect to data producer 110 and/or data consumers 120 in some embodiments. For example, in one embodiment, data pipe manager 130 may be configured to release backing storage for a particular data block at address Y of storage device 115, while data producer 110 may be concurrently appending a data block at address (Y+A), and a data consumer 120A may be concurrently reading a data block at address (Y+C) (where C is less than A). In some embodiments, one or more components of data pipe manager 130 may be incorporated within data producer 110, data consumers 120, and/or additional support servers. Additional details about constituent components of data pipe manager 130, and the functions that may be performed by data pipe manager 130, data producer 110 and data consumers 120 in different embodiments are provided below.

Figure 2:
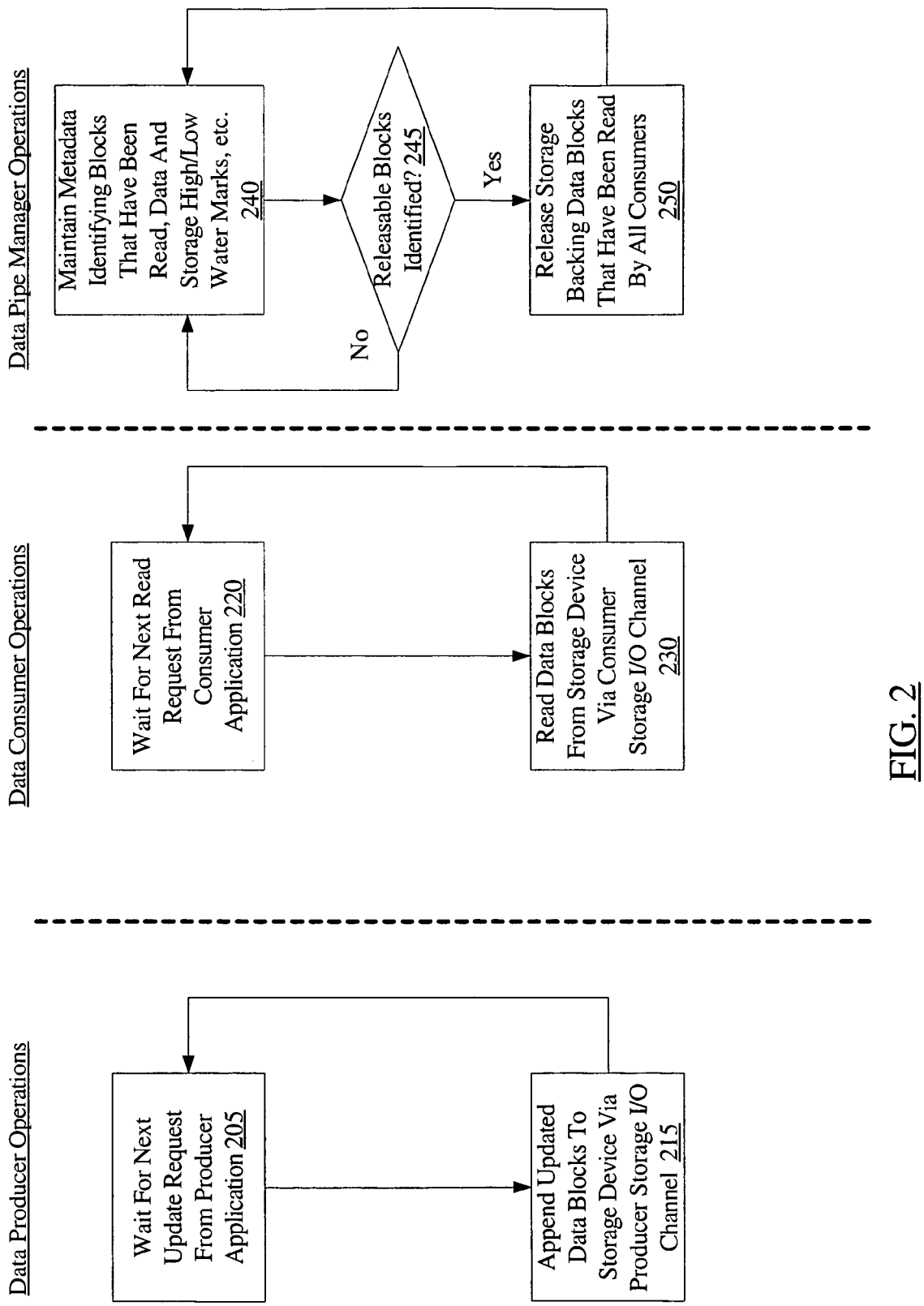
FIG. 2 is a flow diagram illustrating aspects of the operation of a data producer, a data consumer, and a data pipe manager according to one embodiment.

FIG. 2 is a flow diagram illustrating aspects of the operation of data producer 110, a data consumer 120, and data pipe manager 130 according to one embodiment. Data producer 110 may be configured to wait for a next update request from a producer application 111 (block 205). When the update request is received, data producer 110 may be configured to append the updated data blocks to storage device 115 via producer storage I/O channel 135A (block 215). After the updated data blocks have been appended, data producer 110 may be configured to again wait for the next update request (block 205). In some embodiments, an update request issued by a producer application 111 may be processed at data producer 110 by a producer component or agent of data pipe manager 130, e.g., the producer component or agent may be configured to transmit the contents of the updated data blocks to a physical storage device or a storage cache containing a portion of storage device 115. As described below in further detail, in some embodiments, updates to storage device 115 may be batched. For example, in one embodiment a component or agent of data pipe manager 130 may be configured to enqueue update requests received from producer application 111 as they are received, and to transmit a number of enqueued updated data blocks to storage device 115 as part of a single atomic transaction. It is noted that in some embodiments, multiple producer applications 111, or multiple instances of a single producer application 111, may be configured to use a single storage device 115 to transfer data to one or more data consumers 120.

A data consumer 120 may be configured to wait to receive a next read request from a consumer application 121 (block 220 of FIG. 2). When the next read request is received, data consumer 120 may be configured to read the desired data block or blocks from storage device 115 via a consumer storage I/O channel 135B (block 230), provide the contents of the data block to the consumer application 121, and again wait for the next read request (block 205). In some embodiments, multiple consumer applications 121 may be supported within a single data consumer 120. A plurality of consumer applications 121 or a plurality of instances of a consumer application 121 may be configured to share access to the same storage device 115 in some embodiments. In one embodiment, a component of data pipe manager 130 may be incorporated within a data consumer 120, and may be configured to process the read requests generated by one or more consumer applications 121. It is noted that in some embodiments, consumer applications 121 (and/or producer applications 111) may be incorporated within one or more remote servers, i.e., at servers other than data consumers 120 and/or data producer 110. For example, in one embodiment, a data producer 110 may be configured to receive and process update requests from a producer application 111 running on another server or servers, and a data consumer 120 may be configured to process read requests generated from consumer applications 121 at a different server or servers. In some embodiments, a producer application 111 and/or a consumer application 121 may be a distributed or clustered application running on a number of servers or cluster nodes.

Data pipe manager 130 may be configured to maintain metadata identifying blocks of storage device 115 that have been read and/or processed by each data consumer 120, as shown in block 240 of FIG. 2. In addition, as described in further detail below in conjunction with the description of FIG. 3, the metadata may also contain one or more pointers (which may be termed "high watermarks" or "low watermarks") to various regions of the address space of storage device 115. In some embodiments, data pipe manager 130 may be configured to periodically identify blocks of storage device 115 whose backing storage may be released and/or re-used. In other embodiments, data pipe manager 130 may be configured to identify such blocks on demand (e.g., when requested by data producer 110, a data consumer 120, or an administrator) in addition to, or instead of, performing periodic identifications. When such blocks are identified (as detected in decision block 245), data pipe manager 130 may be configured to release the corresponding backing storage (block 250), and to continue to maintain the metadata as before (block 240). If no data blocks are identified that are suitable for a release of backing storage, data pipe manager may also be configured to continue to maintain the metadata until the next scheduled or requested identification occurs. The metadata may be updated for each batch of updates appended by data producer 110 in some embodiments, as described below, and may include one or more commit records that may be stored within storage device 115.

As indicated by the separate flow diagrams for data producer 110, data consumer 120, and data pipe manager 130 in FIG. 2, at least some of the operations of data producers, data consumers and data pipe managers may be performed autonomously, e.g., without tight coupling between data producers and data consumers in some embodiments. Read operations from a data consumer 120, for example, may be performed independently and/or asynchronously with respect to write or append operations performed by a data producer 110 (and with respect to concurrent read operations from other data consumers 120). Similarly, in some embodiments, at least some backing storage allocation, release and/or reuse operations may be performed by data pipe manager 130 independently and/or asynchronously with respect to read and write operations. It is noted that the semantics of data flow between data producers 110 and data consumers 130 may result in the imposition of some constraints on the operations of data producer 110, data consumer 120, and data pipe manager 130 in some embodiments. For example, a data consumer 120 may be prevented from reading past the last updated block of storage device 115 in one embodiment (e.g., an error message may be returned if such a read is attempted), and a data producer 110 may be prevented from writing to an address for which backing storage has not yet been allocated. As noted above, in some embodiments, agents or components of data pipe manager 130 may be incorporated within data producers 110, data consumers 120 and or additional support servers.

Figure 3:
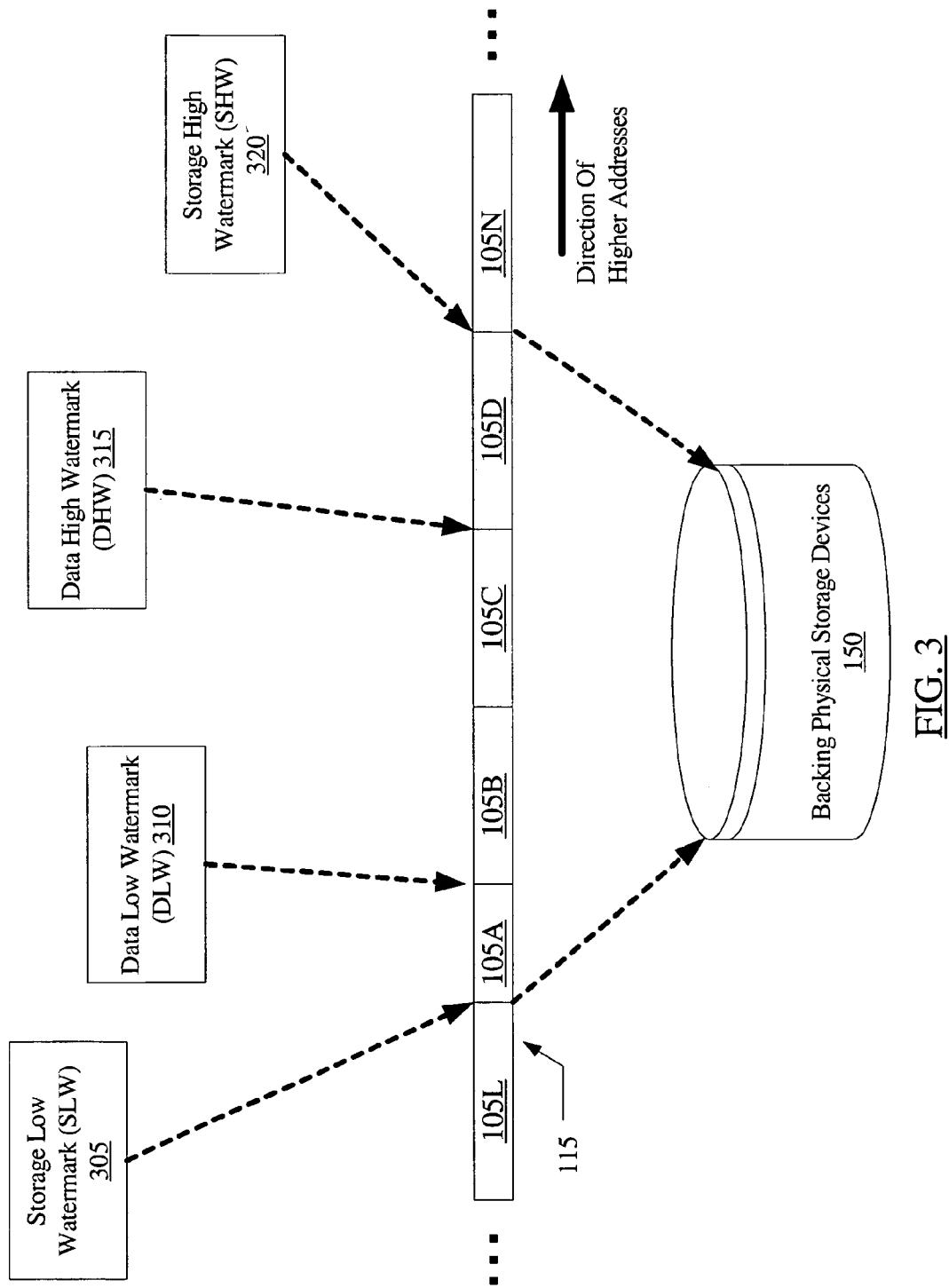
FIG. 3 is a block diagram illustrating pointers that may be included in the metadata for a storage device according to one embodiment.

FIG. 3 is a block diagram illustrating pointers that may be included in the metadata for storage device 115 according to one embodiment. As noted above, storage device 115 may present a linear address space to data producer 110 and data consumers 130. As logical updates to storage device 115 occur, new data blocks containing the updated data may be added at higher addresses within the address space, i.e., logically appended to storage device 115. Each data consumer 120 may be configured to read data blocks of storage device 115 at its own pace, i.e., independently of the rate at which data producer 110 appends new data, and independently of the read rates of other data consumers. After a data consumer 120 has read and/or processed data from a particular block of storage device 115, the data consumer 120 may indicate that it no longer requires access to the particular block, e.g., by notifying data pipe manager 130 that the particular block may be discarded. A data consumer may read any data block that it has not discarded. When a given data block is designated for discarding by all data consumers 120, data pipe manager 130 may release and/or re-use the backing storage for that data block. In some embodiments, e.g., in order to distinguish between blocks whose backing storage may be released and blocks that are still being accessed, data pipe manager 130 may be configured to dynamically maintain low and high data watermarks or pointers into the linear address space of storage device 115. Such watermarks may resemble cursors that keep track of reading, writing and discarding of data.

For example, in the embodiment illustrated in FIG. 3, data pipe manager 130 may be configured to maintain a data low watermark (DLW) 310, which points to the least recently written data that has not been discarded by all data consumers 120, and a data high watermark (DHW) 315, which points to the most recently written data. The blocks of storage device 115 that lie between DLW 310 and DHW 315 (e.g., blocks in regions 105B and 105C of FIG. 3) at a given point of time may thus represent data that has been written by data producer 110 but for which reading and/or processing has not been completed by at least one data consumer 120. In some embodiments, a given data consumer 120, or a component or agent of data pipe manager 130 at a given data consumer 120, may also be configured to maintain its own local data low watermark or discard pointer, as described in further detail below. In such embodiments, data pipe manager 130 may derive DLW 310 from the local data low watermarks maintained for each data consumer 120 (e.g., by determining the lowest address indicated by any data consumer's local data low watermark), and may allow data consumers to view the derived or global DLW 310.

In addition, in the embodiment shown in FIG. 3, data pipe manager 130 may be configured to maintain a storage low watermark (SLW) 305 and a storage high watermark (SHW) 320, respectively identifying the low end and high end block address for the region of the storage device 115 that is currently backed at physical storage devices 150. Thus, for example, at least a portion of regions 105A, 105B, 105C, and 105D of the address space of storage device 115 may be backed at physical storage devices 150 at the point of time illustrated in FIG. 3. In embodiments where redundant storage organizations are used to back storage device 115, for example via mirroring, data blocks between SLW 305 and SHW 320 may be recoverable in the event of certain kinds of failures. Backing storage for regions of the address space of storage device 115 with lower addresses than SLW 305 (e.g., region 105L) may already have been released or de-allocated by data pipe manager 130. Backing storage for regions of the address space of storage device 115 with higher addresses than SHW 320 may not yet have been allocated. Backing storage for blocks whose addresses lie between SLW 305 and DLW 310 may be released or purged by data pipe manager 130, and may be re-used or reallocated (for example, for new updates to storage device 115, or for additional storage devices or data pipes).

In general, data pipe manager 130 may be configured to move each of the watermarks (SLW 305, DLW 310, DHW 315, and SHW 320) in a forward direction (i.e., towards higher logical addresses within storage device 115) as data producer 110 appends new data, data consumers 120 read and discard data, and data pipe manager 130 releases and re-uses backing storage. Ordering restrictions may be imposed on the various watermarks in some embodiments: for example, SLW 305 may not be moved past DLW 310 (i.e., to a higher logical address than DLW 310), otherwise a particular data consumer 120 may be unable to read data it has not yet discarded. Similarly, DHW 315 may not move past SHW 320, because a write to a block for which backing storage has not yet been allocated may fail.

Figure 4:
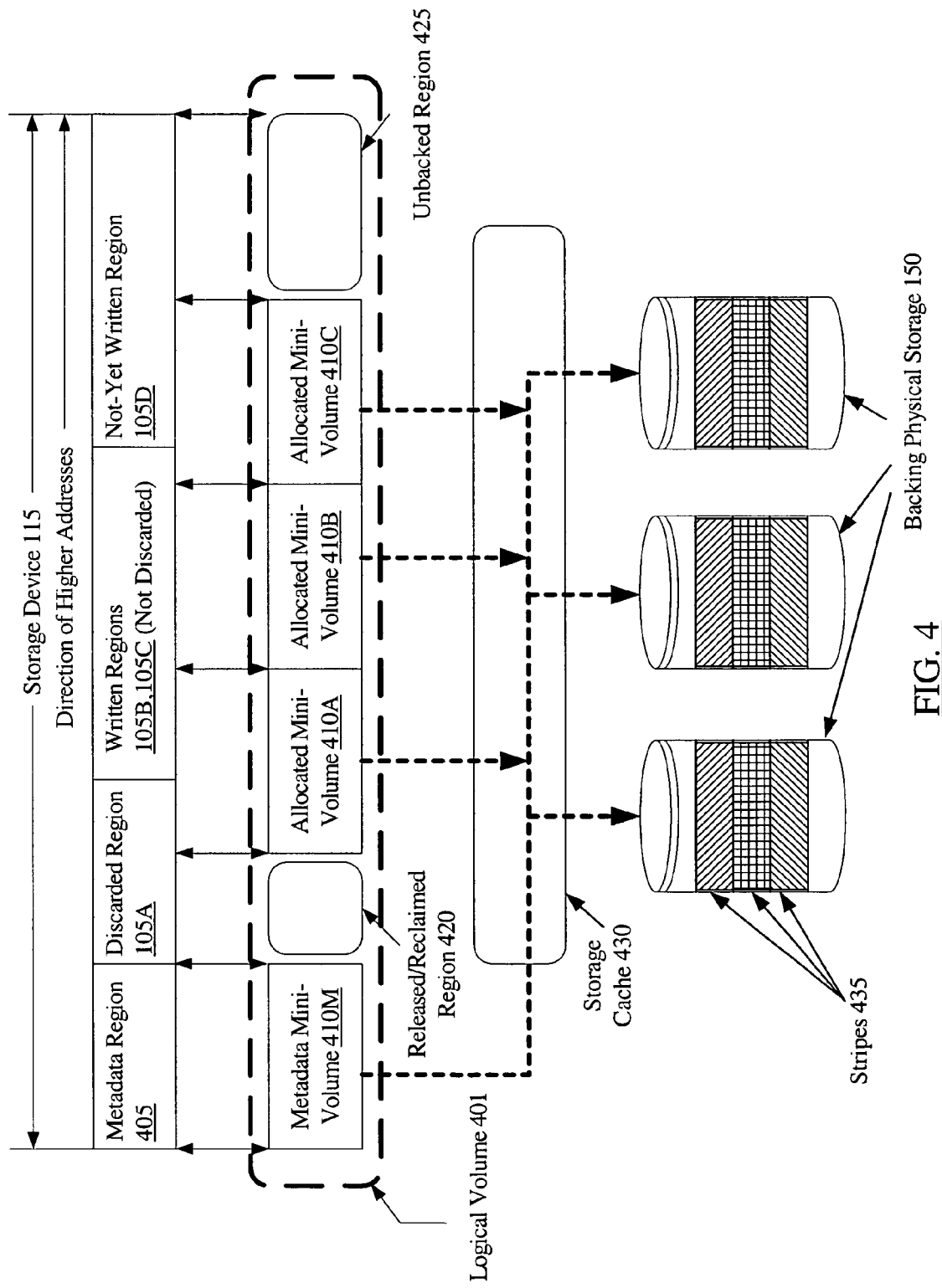
FIG. 4 is a block diagram illustrating aspects of the mapping of the address space of a storage device to backing physical storage devices, according to one embodiment.

FIG. 4 is a block diagram illustrating aspects of the mapping of the address space of storage device 115 to backing physical storage devices 150, according to one embodiment. From the perspective of the underlying storage management system, storage device 115 may comprise a logical volume 401 in some embodiments. In the embodiment shown in FIG. 4, logical volume 401 may in turn comprise a logical concatenation of smaller volumes such as mini-volumes 410M, 410A, 410B, 410C, etc. (collectively, mini-volumes 410). Each mini-volume 410 may be striped across a number of backing physical storage devices 150 (as indicated by stripes 435), e.g., across one or more disks within one or more disk arrays. A storage cache 430 (e.g., a persistent cache comprising one or more NVRAM devices) may server as a front-end for the backing physical storage devices 150 in some embodiments. In embodiments employing a storage cache 430 as a front end for one or more back end disks or disk arrays, for example, updated data blocks of storage device 115 may be written to the storage cache by data producer 110, and may often be retrieved for reading by data consumers 120 from storage cache 430 (i.e., before the updated data blocks are replaced in the storage cache 430, thereby avoiding the latency of accessing the disks or disk arrays).

In the embodiment depicted in FIG. 4, data pipe manager 130 may be configured to maintain metadata (including, for example, the watermarks shown in FIG. 3) within storage device 115 itself, e.g., within a metadata region 405. The metadata region 405 may be mapped to a special metadata mini-volume 410M of logical volume 401. At a given point of time, a portion of a discarded region 105A of storage device 115 may be mapped to one or more allocated mini-volumes 410A, while backing storage for another portion (region 420) of discarded region 105A may already have been released or reclaimed by data pipe manager 130. Regions of storage device 115 that have been written to by data producer 110, but not yet been discarded by all data consumers 120 (e.g., regions 105B and 105C) may also be mapped to portions of one or more allocated mini-volumes such as 410A, 410B and 410C. A portion of an allocated mini-volume 410C may extend beyond the currently written region, e.g., to not-yet-written region 105D of storage device 115. As more backing storage becomes needed (e.g., as data producer 130 fills up mini-volume 410C with new updates), data pipe manager 130 may be configured to allocate new mini-volumes 410 by reusing backing storage from released/reclaimed region 420, or using new backing storage that has not previously been used for storage device 115.

Any of a number of different allocation policies may be used when allocating additional storage for storage device 115 in different embodiments. For example, in one embodiment, mini-volumes 410 may each contain the same number of data blocks, i.e., backing storage may be allocated in fixed size units. In another embodiment, an allocation unit size may be selected dynamically, based for example on the rate at which data producer 110 appends data. In such an embodiment, for example, if data pipe manager 130 detects a rapid exhaustion of allocated storage, which may be caused either by rapid updates or by a mismatch between an update rate and read rates, data pipe manager 130 may dynamically increase the size of new mini-volumes (e.g., if a given mini-volume comprised 128 Megabytes of storage, the next mini-volume may comprise 256 Megabytes, and so on). In some embodiments, the allocation unit size and/or an allocation unit determination policy may be configurable. An allocation triggering policy (i.e., a policy specifying the conditions under which an additional mini-volume should be allocated) may also be configurable in some embodiments. In one embodiment, for example, allocation of a new mini-volume 410 may be triggered when data high watermark (DHW) 315 approaches within a specified number of blocks of storage high watermark (SHW) 320. In another embodiment, released backing storage may be allocated automatically (e.g., as soon as data pipe manager 130 reclaims the backing storage) for a new mini-volume 410, unless, for example, data producer 110 has indicated to data pipe manager 130 that no new updates to storage device 115 are forthcoming.

Figure 5:
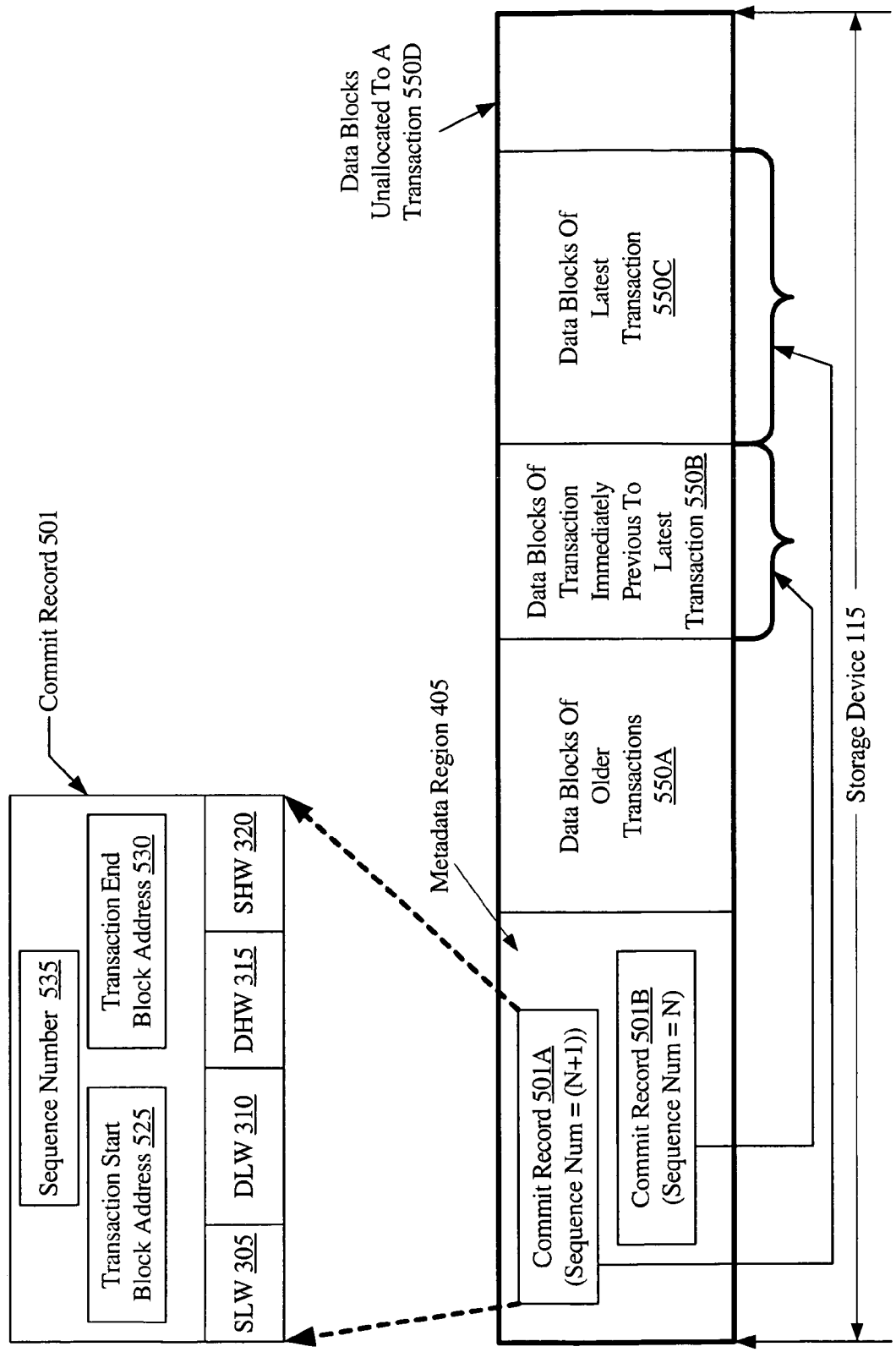
FIG. 5 is a block diagram illustrating constituent components of metadata that may be maintained by a data pipe manager according to one embodiment.

FIG. 5 is a block diagram illustrating constituent components of metadata that may be maintained (e.g., in metadata region 405 mapped to metadata mini-volume 410M) by data pipe manager 130 according to one embodiment. As shown, the metadata may include commit records 501A and 501B (collectively, commit records 501). As noted earlier, in some embodiments, one or more updated blocks may be batched for writing to storage device 115. Each such batch (which may be as small as a single data block in some embodiments under some circumstances) may be written as an atomic transaction in some embodiments: e.g., either the entire contents of the batch may be made persistent, or none of the contents may be made persistent. In the embodiment depicted in FIG. 5, each time a batch of updates is written (for example to a persistent data cache or to disk), a commit record 501 is updated as well. Each commit record 501 includes a sequence number 535, which may be used to identify the commit record that was updated last. For example, in FIG. 5, commit record 501A has a sequence number (N+1), while commit record 501B has a sequence number (N), indicating that commit record 501A corresponds to a later transaction than commit record 501B. In addition to a sequence number 535, in some embodiments a commit record 501 may also include watermarks such as SLW 305, DLW 310, DHW 315, SHW 320, as well as a transaction start block address 525 and a transaction end block address 530. The transaction start block address 525 and transaction end block address may identify the address range at which data blocks for a given transaction are located. For example, in FIG. 5, the transaction start block address 525 and transaction end block address 530 of commit record 501A may point to region 550C of storage device 115, which contains data blocks corresponding to the latest committed transaction (i.e., to the latest batch of updates). Transaction start block address 525 and transaction end block address 530 of commit record 501B may point to region 550B containing data blocks of the transaction immediately previous to the latest transaction.

Commit records 501A and 501B may be updated alternately in some embodiments, e.g., so that an update of one commit record does not overwrite the contents of the other. Such alternate updating of commit records may support an improved level of error recovery, e.g., in case of system crashes or device recording errors. If, for example, a crash or other error occurs while commit record 501A is being updated, recovery may be started using the contents of commit record 501B. In some embodiments, additional entries may be included within commit records 501, such as validation keys, security keys, one or more checksum values that may be used to validate data blocks associated with the commit record or to validate the commit record itself, etc. In one embodiment, metadata region 405 may include metadata information other than the commit records 501 illustrated in FIG. 5, such as device-specific information on backing physical storage devices 150, performance or recovery specifications and/or statistics, etc. It is noted that in some embodiments, a single commit record 501 may be maintained, while in other embodiments more than two commit records may me included in the metadata for storage device 115.

A number of different commit protocols may be used in different embodiments to synchronize a commit record and its associated data blocks (e.g., to ensure that commit record 501A is consistent with its associated data block region 550C). In one embodiment, a serial commit protocol may be used to ensure that updated data blocks for a transaction are saved to persistent storage before a commit record 501 for the transaction is written. In a serial commit protocol, the write latency for an update of a data block (e.g., as seen by a requesting producer application 111) may include the latency for writing the data block or blocks, as well as the latency for writing the commit record. Successful writing of the commit record in such a protocol may indicate that all the corresponding data blocks have also been written. During a recovery operation, for example after a system crash, both commit records 501A and 501B may be read, and the most recently written commit record (e.g., as identified by a sequence number 535) may be used as the starting point for continued processing.

In contrast to the use of a serial commit protocol, the use of a concurrent commit protocol may allow data blocks and commit records 501 to be written in parallel in some embodiments. It is noted that in concurrent commit protocols, as in serial commit protocols, an update requester may not be notified of a completion of a requested update until the corresponding commit record 501 is written to persistent storage. By allowing commit records 501 and data blocks to be written in parallel rather than sequentially, write latency as seen by a requesting producer application 110 may be reduced relative to the write latency that may have been seen if a serial commit protocol were used instead, potentially at the cost of slightly reduced recoverability. In some embodiments, the use of a concurrent commit protocol may, however, require more overall processing than the use of a serial commit protocol (e.g., resulting in higher processor utilization relative to embodiments where a serial commit protocol is used).

In one embodiment, for example, a checksum may be generated from the data blocks to be written, and may be stored in the commit record 501, as part of a concurrent commit protocol. The checksum may be derived from a sample or subset of the data in each sector of the updated data blocks in some embodiments. In some implementations, the sample size (i.e., the amount of data for which the checksum is generated) may be configurable: e.g., the checksum may be generated from a small fraction of the data, such as a few bytes sampled from each sector, or from as large a fraction of the data blocks as desired. In one implementation, a checksum generated from the contents of the commit record 501 may also be included within the commit record 501, in addition to the checksum derived from the data blocks. During a subsequent system recovery, the most recently written commit record 501A may be read and validated, and then the data blocks corresponding to the most recently written commit record 501A may be read and validated against the checksum. If the user data cannot be validated against the checksum, the state of storage device 115 may be rolled back to the previous transaction and the previous commit record.

In some embodiments, a technique employing pre-formatted physical storage may be employed to aid in recovery. For example, each sector of the underlying storage (e.g., at storage devices 150) may be pre-formatted to include a "magic pattern" (i.e., a known string of bit values) in one embodiment. During recovery in such an embodiment, the most recently written commit record 501A is retrieved and all data block sectors associated with the record 501A are scanned for the magic pattern. If the magic pattern is detected, the data for the most recent transaction may not have been successfully written to the underlying storage device 150, and the previous commit record 501B may be used as the starting point for continued processing. In other embodiments, a higher-level recovery service, such as a service embedded within a database log manager or a replication manager, may be configured to provide recovery for the data being transferred via storage device 115.

Figure 6:
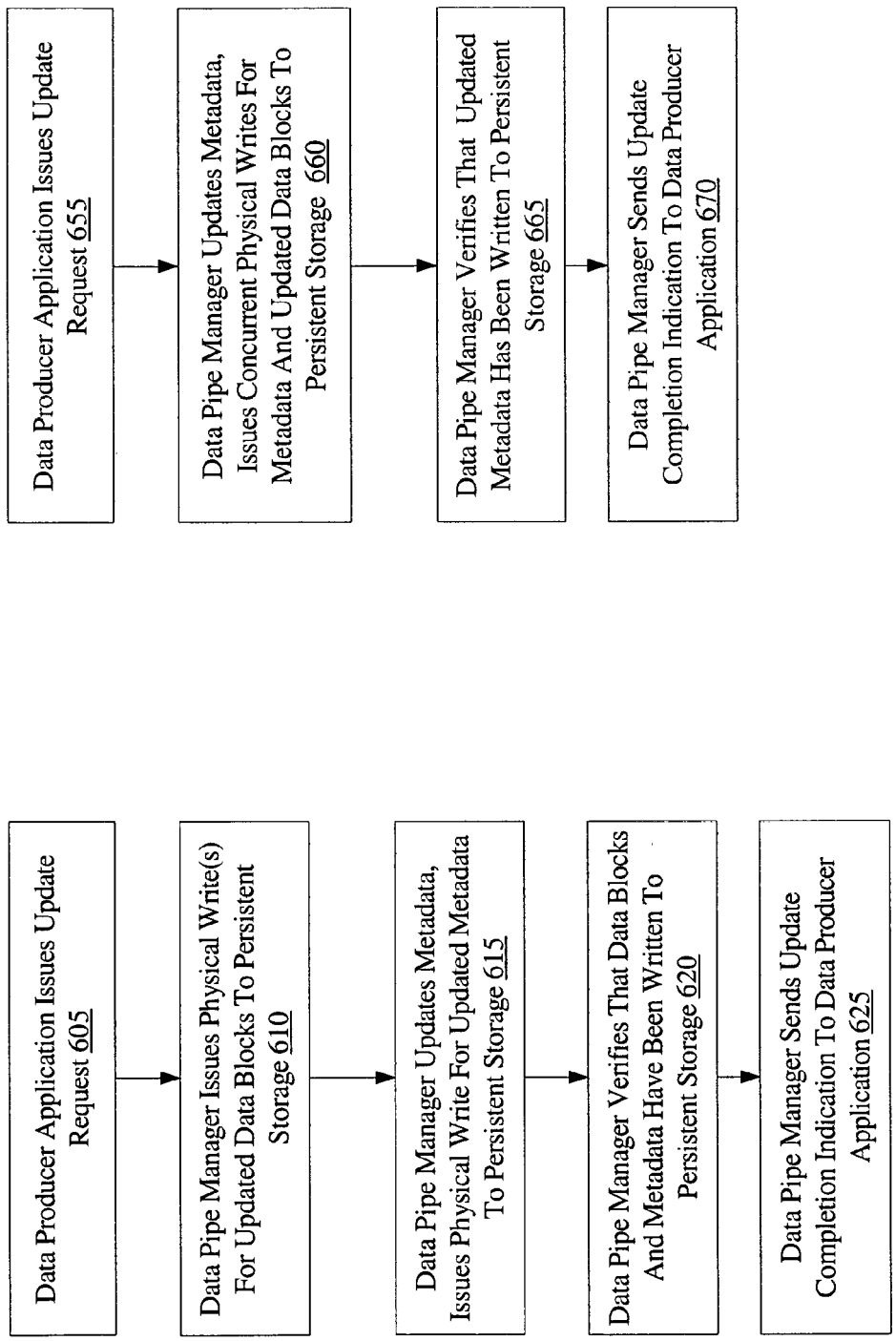
FIG. 6*a* is a flow diagram illustrating aspects of the operation of a data pipe manager in response to an update request in one embodiment where a serial commit protocol is employed.
FIG. 6*b* is a flow diagram illustrating aspects of the operation of a data pipe manager in response to an update request in an embodiment where a concurrent commit protocol is employed.

FIG. 6a is a flow diagram illustrating aspects of the operation of data pipe manager 130 in response to an update request in one embodiment where a serial commit protocol is employed. A producer application 111 may issue a request to update one or more data blocks of storage device 115, as shown in block 605 of FIG. 6a. On receiving the update request (for example at an agent of data pipe manager 130 incorporated within data producer 110), data pipe manager 130 may be configured to issue one or more physical write operations for the updated data blocks to persistent storage (block 610 of FIG. 6*a*). After issuing the physical write requests for the data blocks, data pipe manager 130 may be configured to update the metadata for storage device 115, and issue one or more additional physical write operations to write the updated metadata to persistent storage (block 615 of FIG. 6*a*). After verifying that the data blocks and the commit record have been successfully written to persistent storage (e.g., on receiving indications of successful completions of the physical writes from an underlying operating system), data pipe manager 130 may send an update completion indication to the producer application 111 (block 620 of FIG. 6*a*). Thus, the latency for the update, from the perspective of the requesting producer application 111, may include the latency for the data block write or writes, as well as the latency for the commit record write in the embodiment illustrated in FIG. 6*a*.

FIG. 6*b* is a flow diagram illustrating aspects of the operation of data pipe manager 130 in response to an update request in another embodiment, where a concurrent commit protocol is employed. As in FIG. 6*a*, an update request may be issued from a producer application 111 (block 655 of FIG. 6*b*). On receiving the update request, data pipe manager 130 may be configured to update the metadata, and issue physical write requests for the updated metadata and the data blocks concurrently or in parallel (block 660 of FIG. 6*b*). The update to the metadata may include, for example, the generation and storing of one or more checksum values as described above in some embodiments. After verifying that the commit record has been successfully written to persistent storage (block 665 of FIG. 6*b*), data pipe manager 130 may send an update completion indication to the requesting producer application 111 (block 670 of FIG. 6*b*). The physical writes of the data blocks may not always have completed at the time that the update completion indication is sent to the requesting producer application 111 in some implementations. Thus, the update latency as perceived by the requesting application may be smaller in an embodiment employing a concurrent commit protocol (e.g., the embodiment shown in FIG. 6*b*), than the update latency that may have been perceived in the case of a serial commit protocol (e.g., in the embodiment shown in FIG. 6*a*).

Figure 7:
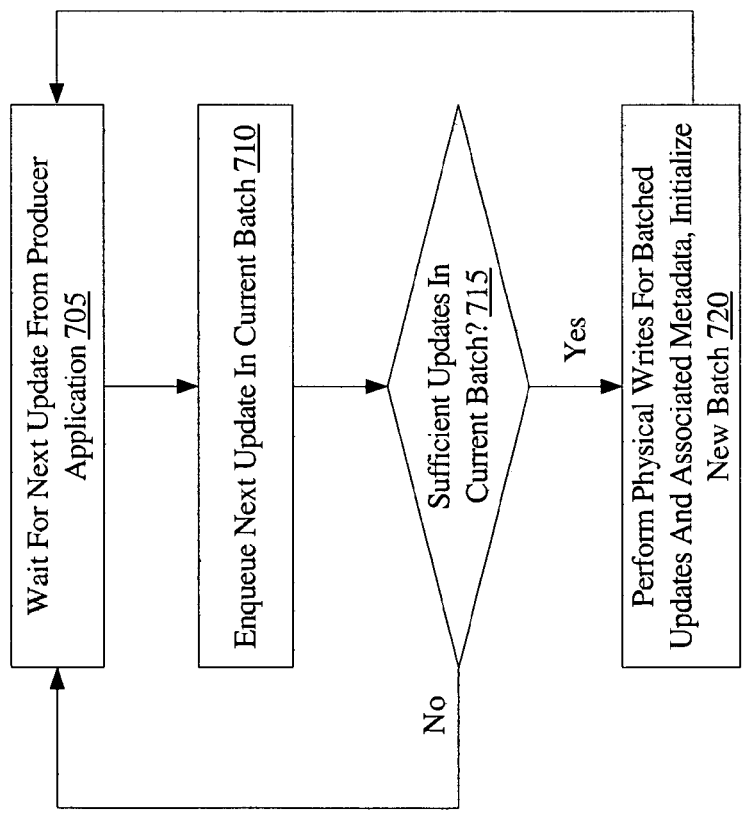
FIG. 7 is a flow diagram illustrating aspects of the operation of a data pipe manager in an embodiment where updated data blocks may be written to a storage device in batches.

In some embodiments, as noted previously, updated data blocks may be written to storage device 115 in batches. FIG. 7 is a flow diagram illustrating aspects of the operation of data pipe manager 130 in such an embodiment. Data pipe manager 130 may be configured to wait for a next update request from a producer application 111 (block 705 of FIG. 7). When the next update request is received, data pipe manager 130 may enqueue the next update request within a current batch of updates for batched processing (block 710). When sufficient updates have been accumulated in the current batch (as detected in decision block 715), data pipe manager 130 may be configured to update metadata (e.g., a commit record 501) and to perform the physical writes for the current batch and the updated metadata (block 720). If enough updates for the current batch have not been accumulated, data pipe manager 130 may resume waiting for the next update. Similarly, after the current batch has reached a desired size, data pipe manager 130 may initialize a new batch and resume waiting for new update requests. In some embodiments, data blocks and metadata for a given batch may be written to persistent storage as a single transaction, and the update requester (such as a data producer application 111) may be notified of a completion of the batched update only after the data blocks and the metadata have been written to persistent storage. The size of a batch (i.e., the amount of data that may be written as one transaction) may be config-urable in some embodiments—e.g., as specified in one or more configuration files by a system administrator. In other embodiments, an adaptive batch sizing policy may be employed, where, for example, batch size may be dynamically adjusted by data pipe manager 130 in response to changing conditions (such as measured latencies, update rates, and the like). In many implementations, fairly large batch sizes (such as several megabytes) may be used without causing substantial I/O delays under normal operating conditions.

Each data consumer 120 may be configured to read blocks of storage device 115 independently of, and concurrently with, other data consumers 120 in some embodiments, as noted earlier. Data pipe manager 130 may be configured to allow data consumers 120 (or consumer applications 121) to connect to, and disconnect from, a given storage device 115, and to keep track of the set of data consumers 120 that are correctly connected to the storage device. A connected data consumer 120 may read from the storage device autonomously, e.g., without interacting with other data consumers 120 or data producer 110. In embodiments where components of data pipe manager 130 are incorporated within a support server, a data consumer 120 may require only infrequent interactions with the support server, for example to connect to or disconnect from storage device 115, or to handle read errors or other failures. Although data retrieval by a data consumer 120 may normally be in sequential order (i.e., data consumer 120 may read data blocks of storage device 115 in the order in which the data blocks were written by data producer 110), a data consumer 120 may re-read any data block that it has not explicitly designated for discarding. Further details on how a data consumer may designate data blocks to be discarded are provided below in conjunction with the description of FIG. 8. The rate at which a given data consumer 120 reads data may be limited only by the transfer rate of the consumer storage I/O channel 130B being used for the data transfer; e.g., no locking or intermediary data transfer agents may be required. A data consumer 210 may be configured to periodically read metadata for storage device 115 in some embodiments, e.g., to obtain a version of DLW 310 and DHW 315. Data consumer 120 may read blocks between its versions of DLW 310 and DHW 315. Upon reaching its version of DHW 315 (i.e., after having read data blocks with addresses lower than the address pointed to by its version of DHW 315), data consumer 120 may retrieve the latest version of DHW 315, e.g., by re-reading the latest commit record 501. In some embodiments, if the latest DHW 315 is the same as the local version of the DHW previously obtained by data consumer 120 (indicating that data consumer 120 has read all available data blocks), data consumer 120 may wait or perform other functions before again retrieving the latest available DHW 315. In some embodiments, an adaptive algorithm to adjust the interval between successive retrievals of the latest DHW 315 may be used, for example increasing the interval each time until a changed DHW is retrieved.

Figure 8:
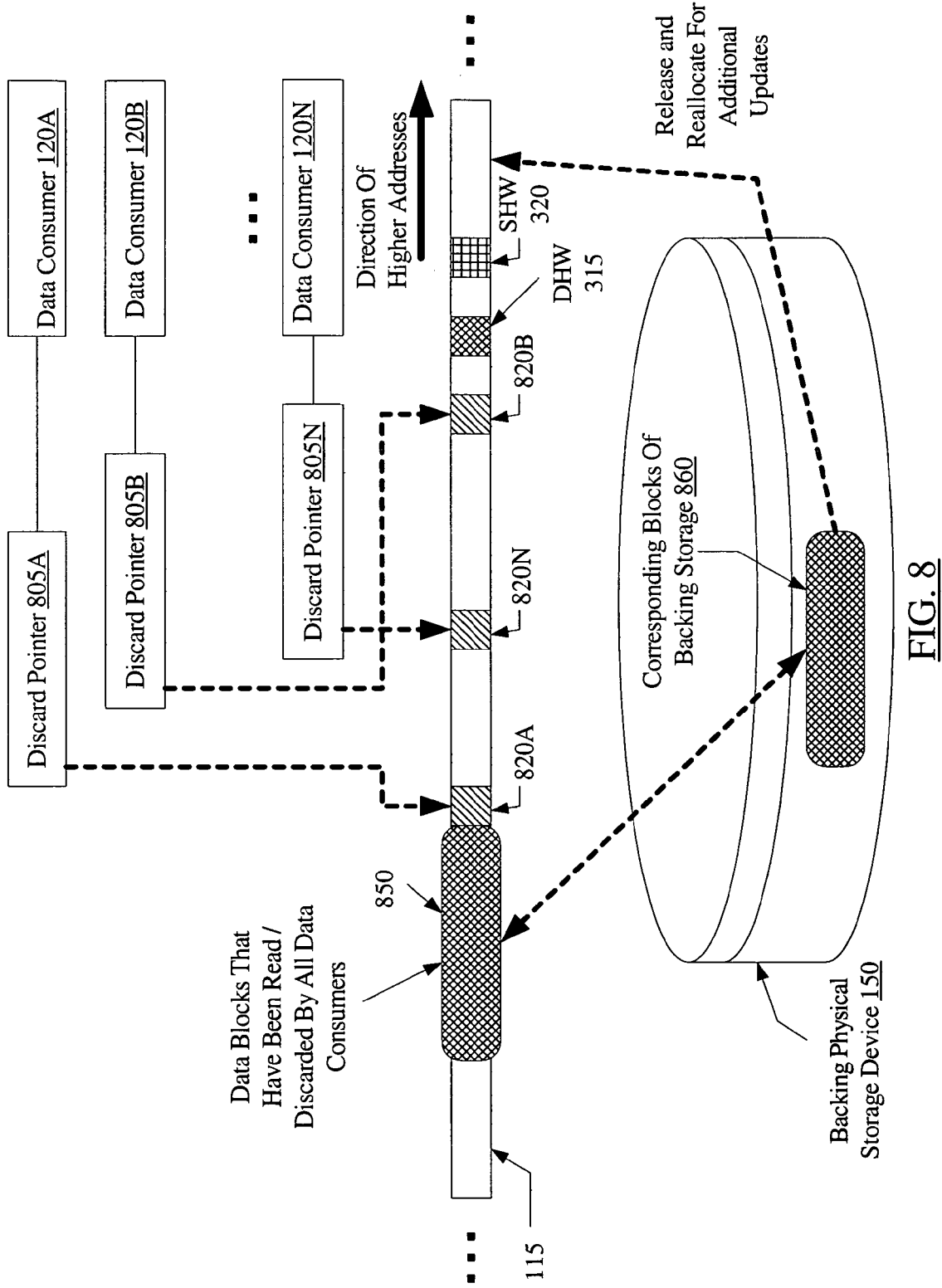
FIG. 8 is a block diagram illustrating an embodiment where a discard pointer may be maintained for each data consumer.

In some embodiments, each data consumer 120 may be configured to keep track of data blocks of storage device 115 that have been read and processed by the data consumer, and to which access from the data consumer may no longer be required. FIG. 8 is a block diagram illustrating an embodiment where a discard pointer may be maintained for each data consumer 120 to identify such data blocks. For example, discard pointer 805A may point to data block 820A, indicating that data consumer 120A is willing to discard data blocks of storage device 115A with addresses lower than 820A. Similarly, discard pointer 805B associated with data consumer 120B may point to data block 820B, indicating that data consumer 120B no longer requires access to data blocks with addresses lower than 820B, and discard pointer 805N may point to data block 820N, indicating that data consumer 120N no longer requires access to data blocks with addresses lower than 820N. A discard pointer may represent a local version of a data low watermark for a given data consumer. A given data consumer 120 may not read data at a lower address than the address pointed to by its associated discard pointer 805, but may read data blocks at higher addresses that may have been discarded by other data consumers 120. For example, in FIG. 8, data consumer 120A may read data blocks between 820A and DHW 315, but data consumer 120B may not read data blocks between 820A and 820B. In some embodiments, a central purger incorporated within data pipe manager 130 may coordinate the release of backing storage from region 850, i.e., a region consisting of data blocks that have been read and discarded by all data consumers. Each data consumer 120 or an agent or component of the data pipe manager at the data consumer may be configured to provide the latest version of its discard pointer to the central purger. Further details about central purgers and their interactions with other components of data pipe manager 130 are provided below in conjunction with the description of FIG. 9. Such a central purger may, for example, derive the DLW 305 after aggregating information from the discard pointers 805 for each data consumer 120, and coordinate the release of backing storage for addresses lower than DLW 305. The released backing storage may be re-allocated for data blocks at addresses beyond SHW 320.

Figure 9:
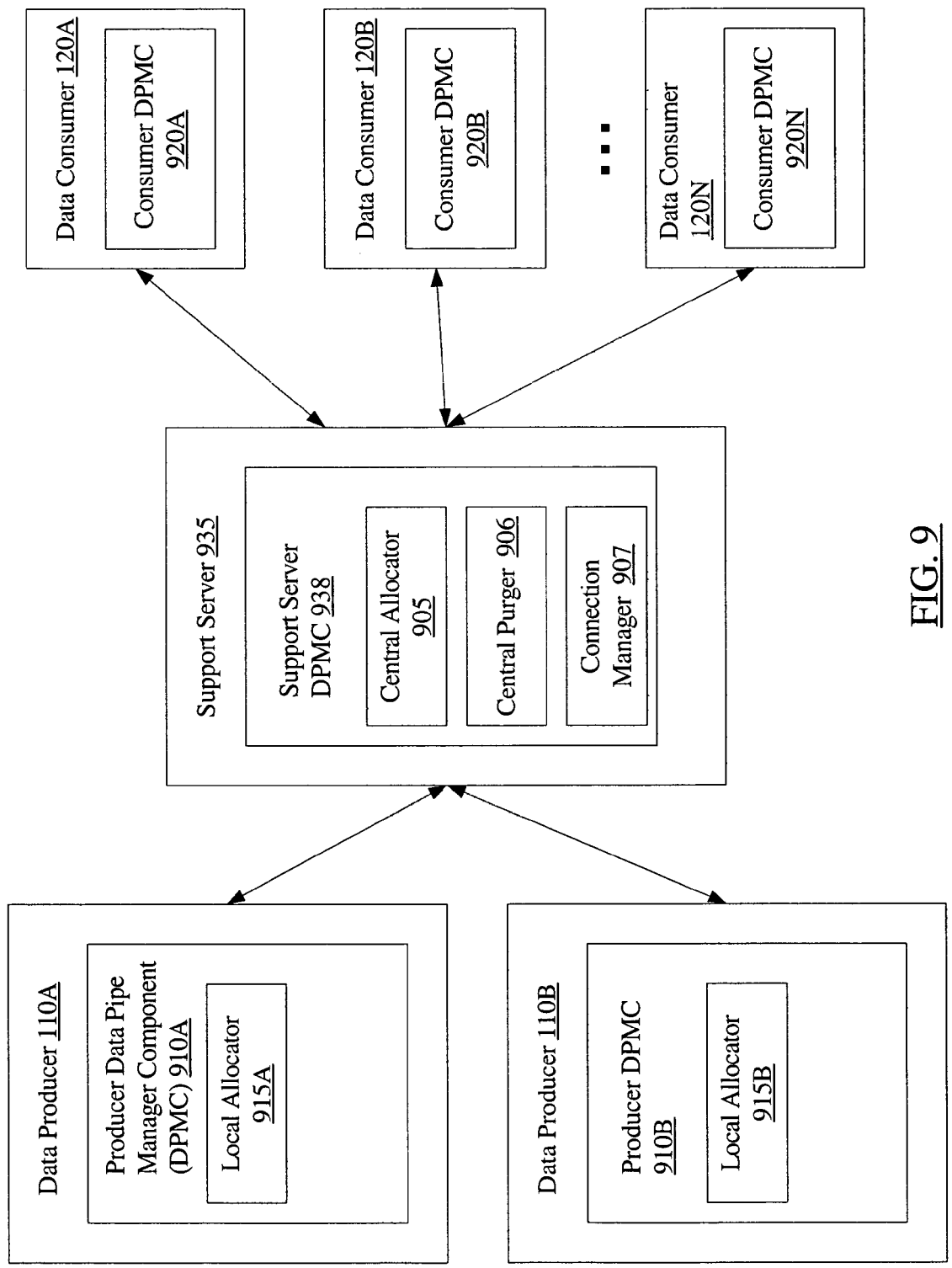
FIG. 9 is a block diagram illustrating an embodiment where components of a data pipe manager may be distributed among data producers, data consumers, and one or more support servers.

FIG. 9 is a block diagram illustrating an embodiment where components of data pipe manager 130 may be distributed among data producers 110, data consumers 120, and one or more support servers 135. Data producers 110A and 110B may each have access to one or more associated storage devices 115 (not shown in FIG. 9) that are not shared for writing between the data producers. That is, only one data producer may write to a given storage device 115, although each data producer may write to multiple storage devices 115. As shown, each data producer 120 may incorporate a respective producer data pipe manager component (producer DPMC) 910, including a local allocator 915. For example, data producer 110A may include producer DPMC 910A, data producer 110B may include producer DPMC 910B, and so on. Each data consumer 120 may include a respective consumer data pipe manager component (consumer DPMC) 920 (consumer DPMC 920A in data consumer 120A, consumer DPMC 920B in data consumer 120B, etc.). Support server 935 may include a support server data pipe manager component (support server DPMC) 938, which may in turn include a central allocator 905A, a central purger 906, and a connection manager 907. In some embodiments, a producer DPMC 910 and/or a consumer DPMC 920 may be configured establish a network connection (e.g., using TCP/IP) to exchange control or configuration information with a support server DPMC 938. For example, in one embodiment, requests to connect to or disconnect from a storage device 115 may be sent to connection manager 907 over TCP/IP from data consumers 120 and/or data producers 110.

Producer DPMCs 910 may be configured to provide a number of functions to help the management of storage device 115 in different embodiments. For example, in one embodiment, a producer DPMC 910 may be configured to connect to and disconnect from a storage device 115 by communicating with support server DPMC 935, enqueue updates for batched writes to the storage device 115, transmit enqueued data blocks over a producer storage I/O channel 135A, and/or update commit records and other metadata for the storage device 115. In addition, a producer DPMC 910 may be configured to release and reallocate backing storage corresponding to discarded data blocks in coordination with central purger 906 in some embodiments. In such an embodiment, central purger 906 may be configured to issue data purge and re-allocation requests for data blocks at addresses lower than DLW 305 to a local allocator 915 within a producer DPMC 910. That is, while the central purger may be configured to perform the processing required to identify the data blocks 850 whose backing storage 860 may be released and reused, the actual release and reallocation may be performed by the local allocator 915 within a data producer 110.

Consumer DPMCs 920 may be configured to provide a number of consumer-side functions related to the management of one or more storage devices 115 in various embodiments. In one embodiment, a consumer DPMC 920 may be configured to connect to a storage device 115 by communicating with support server DPMC 935, obtain local versions of metadata elements such as DLW 310 and DHW 315 at the data consumer 120, read data blocks over consumer storage I/O channel 135B, and/or notify support server DPMC 935 when a discard pointer for the associated data consumer 120 is updated.

In some embodiments, a storage device 115 may grow by concatenating mini-volumes 410 at one end of the data address space of the storage device 115, and may shrink as a result of a release or reclamation of mini-volumes at the other end of the data address space. It is noted that in one embodiment, backing storage for metadata mini-volume 410M may not be released or re-used during normal operation. The released backing storage may be re-used for the same storage device 115 in some embodiments, and/or may be recycled among multiple storage devices 115 in other embodiments. The local allocator 915 within a given producer DPMC 910 may be responsible for managing release and reallocation of backing storage for the storage device 115 associated with the corresponding data producer 110, while central allocator 905 at support server 935 may be responsible for redistributing backing storage among different storage devices 115. For example, in some embodiments, a local pool of released and reusable backing storage, which may be termed a "local recycling bin", may be maintained by a local allocator 915 at each data producer 110, while a global pool of released backing storage or "global recycling bin" may be maintained by central allocator 905 at support server 935. If sufficient released storage can be found in its local recycling bin, local allocator 915 may allocate new mini-volumes 410 from the local recycling bin. If not enough released storage is found in the local recycling bin, local allocator 915 may request additional storage from central allocator 905. In some embodiments, a local allocator 915 may be configured to maintain a minimum supply of reusable storage within its local recycling bin, for example in case the central allocator 905 is inoperable or unreachable when additional storage is needed for a storage device 115. Central allocator 905 may also be configured to maintain a minimum supply of reusable storage within the global recycling bin, and to request or obtain additional free storage from one or more local allocators 915 as needed in one embodiment. In other embodiments, central allocator 905 may also be configured to take over the backing storage release and allocation functions for a given local allocator 915 in the event that the local allocator or its associated data producer 110 becomes inoperable.

As described above, in some embodiments, central purger 906 may be configured to aggregate discard notifications (e.g., notifications including updated discard pointers 805) from consumer DPMCs 920, and to notify a local allocator 915 as the DLW 310 for a given storage device advances, allowing the local allocator 915 to release backing storage for addresses lower than the DLW 310. Connection manager 907 may provide a number of support functions for data producers 110 and data consumers 120 in various embodiments. For example, in one embodiment, connection manager 907 may allow one or more data consumers 120 and a single data producer 110 to connect to a given storage device 115, ensure that only one data producer 110 has write access to a given storage device 115, and verify that backing storage devices 150 are accessible from the connected data producer and data consumers. In other embodiments, connection manager 907 may also be configured to ensure that connectivity between central purger 906 and consumer DPMCs 920 is maintained (e.g., over a TCP/IP connection), and/or that connectivity between central allocator 905 and local allocators 915 is maintained. During reconfigurations of a logical volume 401 corresponding to a storage device 115, connection manager 907 may also be configured to suspend access from the data producer 110 and from data consumers 120 connected to the storage device.

When a data consumer 120 disconnects normally from a given storage device 115 (e.g., if the disconnection is requested by the data consumer rather than being caused by an error or failure), in one embodiment connection manager 907 may be configured to designate all the data that has been read by the data consumer as discarded, even if the discard pointer 805 corresponding to the data consumer 120 has not been updated to reflect all the data read. If the data consumer 120 reconnects to the same storage device 115 after a normal disconnection, connection manager 907 may be configured to set the data consumer's discard pointer 805 to the next block after the blocks that were discarded at the last disconnection. For abnormal disconnections (e.g., disconnections that may have been forced by errors), connection manager 907 may not adjust discard pointers 805.

In some embodiments, a support server 935 may be configured for failover, e.g., an alternate support server may be configured to take over the functionality of a primary support server in the event of a failure. In other embodiments, a data producer 110 or a data consumer 120 may be configured to take over the support server's functions if a failure occurs. It is noted that one or more components of support server DPMC 938 may be incorporated within a data producer 110 or within a given data consumer 120 in some embodiments. For example, in a minimal configuration, a support server may be omitted, a central purger 906 may be incorporated within a data consumer 120, and central allocator 905 and connection manager 907 may be incorporated within a data producer 110. In one specific embodiment, central allocator 905 may be omitted entirely, and release and allocation of backing storage may be managed entirely by local allocators 915.

Data pipe manager 130 may provide one or more interfaces to allow access to storage device 115 in different embodiments. In one embodiment, for example, data pipe manager 130 may support an application programming interface (API) that may allow producer applications 111 and consumer applications 121 to access storage device 115 using functions or methods similar to typical file system functions. For example, in such an embodiment, functions such as open( ), close( ), read( ), and write( ) may be provided to producer and consumer applications. In some implementations, the API to access storage device 115 may include at least a subset of a file system API conforming to a standard such as POSIX (Portable Operating System Interface). The semantics of various API options (such as options to open( ) specifying read-only access versus read-write access or exclusive-write access) may differ for data producers 110 and data consumers 115 in some embodiments. For example, in one implementation, an invocation of an open( ) function with a particular option (e.g., an O_TRUNC or truncate option) may be used allocate a new mini-volume. In addition to an API allowing user-level applications to access a storage device 115, in some embodiments an internal API may also be provided to allow lower-level interactions with storage devices 115, such as interactions at a volume manager level.

A number of different types of end-user applications, as well as internal storage management application, may utilize the data transfer capabilities supported by storage devices 115 in different embodiments. For example, as noted earlier, a data producer 110 may be configured to extract contents of a database repository, and transfer the extracted data through a storage device 115 for analysis by a data mining consumer application 121. Data producer 110 may begin writing extracted data to the storage device 115 as soon as the data extraction process begins, and data consumer 120 may being reading and analyzing data from the storage device 115 as soon as the data producer commences writing. The asynchronous and autonomous nature of reading and writing to storage device 115 may lead to reductions in overall data transfer time compared to other solutions which may, for example, require the data to be fully extracted first, then fully transferred (e.g., via FTP), before reading may commence. Data replication and archival applications may also be configured to utilize the data transfer techniques implemented at storage devices 115 as described above, especially in scenarios where at least part of the processing and I/O load for data transfer is offloaded to one or more support servers 935 instead of being handled at servers where production applications are executed. Internal storage management operations potentially involving large data transfers, such as frozen image services that may be embedded within volume managers or operating systems, may also be implemented using storage devices 115 in some embodiments.

Figure 10:
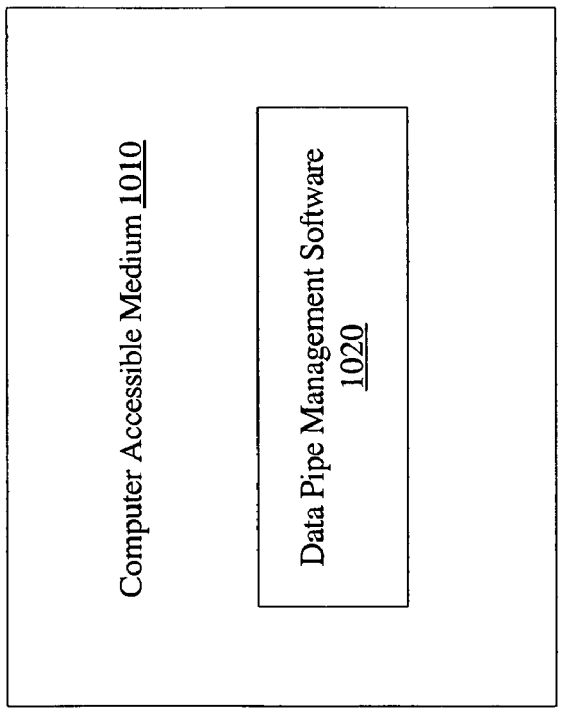
FIG. 10 is a block diagram illustrating a computer accessible medium according to one embodiment.

FIG. 10 is a block diagram illustrating a computer accessible medium 1010, according to one embodiment. The computer accessible medium may include data pipe management software 1020 executable to implement the functionality of data producers 110, data consumers 120, and data pipe manager 130 as described above, including components of the data pipe manager that may be executed at support servers 935, data producers 110, or data consumers 120. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. In some embodiments, data pipe management software 1020 may be included within an operating system, volume manager, or another software package. In other embodiments, one or more components of data pipe management software 1020 may be packaged as independent software modules.

In general, a data producer 110 may comprise any hardware and/or software device capable of generating data for transfer to a data consumer 120 (for example on behalf of one or more producer applications 111), and a data consumer 120 may comprise any hardware and/or software device capable of receiving or reading data transferred by a data producer 110 (for example on behalf of one or more consumer applications 121). In one embodiment, for example, a first computer server may be a data producer 110, a second computer server may be a data consumer 120, and a third computer server may be a support server 935. Each computer server may comprise one or more processors coupled to one or more memories, as well as one or more I/O interfaces such as storage adapters allowing access to storage I/O channels, network interface cards, a mouse, keyboard and other peripherals. The one or more processors may be implemented using any desired architecture or chip set, such as the SPARC™ architecture from Sun Microsystems or the x86-compatible architectures from Intel Corporation, Advanced Micro Devices, etc. The one or more memories may be implemented using any appropriate medium such as any of various types of RAM (e.g., DRAM, SDRAM, RDRAM, SRAM, etc.). In some embodiments, the operating system in use at a data producer 110 may differ from the operating system in use at a data consumer 120 or the operating system in use at a support server 935. Backing physical storage devices 150 may include any of a number of different types of physical storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a data producer;
   one or more data consumers;
   a storage device; and
   a data pipe manager;
   wherein the data producer is configured to:
   append updated data blocks to the storage device via a producer storage input/output (I/O) channel;
   wherein each data consumer of the one or more data consumers is configured to:
   read data blocks of the storage device via a consumer storage I/O channel;
   and wherein the data pipe manager is configured to:
   maintain metadata identifying data blocks of the storage device that have been read by each data consumer of the one or more data consumers; and
   release backing storage corresponding to the data blocks of the storage device that have been read by each data consumer of the one or more data consumers.

2. The system as recited in claim 1, wherein a data consumer of the one or more data consumers is configured to read a first data block of the storage device concurrently with the data producer appending a second data block to the storage device.

3. The system as recited in claim 1, wherein the data pipe manager is configured to release the backing storage concurrently with the data producer appending a data block to the storage device.

4. The system as recited in claim 1, wherein the data pipe manager is further configured to:
   allocate released backing storage to store additional updated data blocks appended by the data producer.

5. The system as recited in claim 1, wherein the storage device comprises a logical volume.

6. The system as recited in claim 5, wherein the logical volume is striped across a plurality of physical storage devices.

7. The system as recited in claim 1, wherein the metadata comprises an indicator identifying a latest updated data block of the storage device.

8. The system as recited in claim 7, wherein the data pipe manager is further configured to:
   perform a first physical write operation including a metadata update corresponding to an appended data block concurrently with a second physical write operation including contents of the appended data block.

9. The system as recited in claim 1, wherein the metadata comprises an indicator identifying a region of the storage device that is currently backed by persistent storage.

10. The system as recited in claim 1, wherein the data pipe manager is configured to maintain the metadata within the storage device.

11. The system as recited in claim 1, wherein the data producer is configured to append a plurality of updated data blocks to the storage device as part of a single atomic transaction.

12. A method comprising:
    a data producer appending updated data blocks to a storage device via a producer storage input/output (I/O) channel;
    each data consumer of one or more data consumers reading data blocks of the storage device via a respective consumer storage I/O channel;
    maintaining metadata identifying data blocks of the storage device that have been read by each data consumer of the one or more data consumers; and
    releasing backing storage corresponding to data blocks of the storage device that have been read by each data consumer of the one or more data consumers.

13. The method as recited in claim 12, wherein a data consumer of the one or more data consumers is configured to read a first data block of the storage device concurrently with the data producer appending a second data block to the storage device.

14. The method as recited in claim 12, wherein the backing storage is released concurrently with the data producer appending a data block to the storage device.

15. The method as recited in claim 12, further comprising:
    allocating released backing storage to store additional updated data blocks appended by the data producer.

16. The method as recited in claim 12, wherein the storage device comprises a logical volume.

17. The method as recited in claim 12, wherein the metadata comprises an indicator identifying a latest updated data block of the storage device, further comprising:
    performing a first physical write operation including a metadata update corresponding to an appended data block concurrently with a second physical write operation including contents of the appended data block.

18. The method as recited in claim 12, further comprising: maintaining the metadata within the storage device.

19. A computer accessible storage medium comprising program instructions, wherein the instructions are executable to:
- append updated data blocks to a storage device via a producer storage input/output (I/O) channel from a data producer;
- read data blocks of the storage device via a respective consumer storage I/O channel at each data consumer of one or more data consumers;
- maintain metadata identifying data blocks of the storage device that have been read by each data consumer of the one or more data consumers; and
- release backing storage corresponding to data blocks of the storage device that have been read by each data consumer of the one or more data consumers.

20. The computer accessible medium as recited in claim 19, wherein the instructions are further executable to:
- read a first data block of the storage device at a data consumer of one or more data consumers concurrently with the appending of a second data block to the storage device from the data producer.

21. The computer accessible medium as recited in claim 19, wherein the instructions are further executable to:
- release the backing storage is released concurrently with the appending of a data block to the storage device from a data producer.

22. The computer accessible medium as recited in claim 19, wherein the instructions are further executable to:
- allocate released backing storage to store additional updated data blocks appended from the data producer.

23. The computer accessible medium as recited in claim 19, wherein the metadata comprises an indicator identifying a latest updated data block of the storage device, wherein the instructions are further executable to:
- perform a first physical write operation including a metadata update corresponding to an appended data block concurrently with a second physical write operation including contents of the appended data block.

24. The computer accessible medium as recited in claim 19, further comprising:
- maintaining the metadata within the storage device.

* * * * *